United States Patent [19]

Weber et al.

[11] Patent Number: 4,598,738

[45] Date of Patent: Jul. 8, 1986

[54] TUBE CLOSING DEVICE, ESPECIALLY FOR HEAT-EXCHANGER TUBES

[75] Inventors: Robert Weber, Uttenreuth; Siegfried Förner, Erlangen, both of Fed. Rep. of Germany

[73] Assignee: Kraftwerk Union Aktiengesellschaft, Mülheim, Fed. Rep. of Germany

[21] Appl. No.: 480,853

[22] Filed: Mar. 31, 1983

[30] Foreign Application Priority Data

Apr. 1, 1982 [DE] Fed. Rep. of Germany ....... 3212223

[51] Int. Cl.$^4$ .............................................. F16L 55/10
[52] U.S. Cl. ...................................... 138/89; 138/90; 165/76; 15/104.16
[58] Field of Search ............................ 138/89, 90, 91; 15/104.16; 220/234, 235; 165/76

[56]  References Cited

U.S. PATENT DOCUMENTS

| 2,256,775 | 9/1941 | Aubbell | 138/89 |
| 2,921,608 | 1/1960 | Crawford et al. | 138/89 |
| 2,974,685 | 3/1961 | Ver Nooy | 138/90 |
| 4,462,430 | 7/1984 | Anthony et al. | 138/89 |

FOREIGN PATENT DOCUMENTS 198535  6/1923  United Kingdom .................. 138/91

Primary Examiner—James E. Bryant, III

Attorney, Agent, or Firm—Herbert L. Lerner; Laurence A. Greenberg

[57] ABSTRACT

Tube-closing device with a tube plug having a plug casing with an enlargeable outer diameter for producing sealing surface pressure, and a plug core surrounded by the plug casing, the plug core and the plug casing being displaceable relative to one another, enlargement of the outer diameter of the plug casing being effected by a setting tool for the tube plug insertable into a respective tube to be closed, the setting tool being couplable with the plug core through the intermediary of a detachable holding rod and engageable with the plug casing through the intermediary of a support sleeve through which the holding rod extends, the setting tool having tensioning structure for producing an axial relative displacement of the holding rod and the support sleeve and thereby, of the plug casing and the plug core, includes coaxially disposed cuff rings mounted on the plug casing for effecting a seal between the plug casing and the plug core, the cuff rings having a starting, unstressed conical form with an outer diameter at most equal to the inner diameter of the tube to be closed, the cuff rings being flattenable out of the conical form thereof by the relative displacement of the plug casing and the plug core so that the outer diameter thereof is enlarged and they dig slightly into the wall of the tube to be closed.

18 Claims, 14 Drawing Figures

TUBE CLOSING DEVICE, ESPECIALLY FOR HEAT-EXCHANGER TUBES

The invention relates to a tube-closing device, especially for heat-exchanger tubes, having a tube plug with a plug casing having an enlargeable outer diameter for producing sealing surface pressure, and a plug core surrounded by the plug casing, the plug core and the plug casing being displaceable relative to one another, enlargement of the outer diameter of the plug casing being effected by setting tool for the tube plug insertable into a respective tube to be closed, the setting tool being couplable with the plug core through the intermediary of a detachable holding rod and engageable with the plug casing through the intermediary of a support sleeve through which the holding rod extends, the setting tool having tensioning means for producing an axial relative displacement of the holding rod and the support sleeve and, thereby, of the plug casing and the plug core.

A tube-closing device of this general type is known from U.S. Pat. No. 3,708,093. Such tube-closing devices are of special importance for nuclear technology installations, and accordingly for the steam generators of pressurized-water-nuclear reactors. The important objective is to seal and deactivate, reaspectively, steam-generator tubes which are found to be defective as a result of turbulence flow tests performed with turbulence flow-test equipment. In this regard, mechanically operating plug insertion or setting devices in comparison to so-called bursting or exploding plugs have the advantage that they are better suited for remote-controlled plug-setting operation. With plugs for closing tubes which seal due to an increase or enlargement of the diameter thereof, a special problem is to obtain a reliable, absolutely sealed seating of the tube, plug and seal plug, respectively, without having to apply too great a plug-setting force, because a plug setting device which is too large requires correspondingly heavy and voluminous manipulators. An additional problem of tube plugs arises at their removal and dismantling, respectively; as a rule this is either impossible, or can be done only with great effort, and is not within the capability of normal manipulators. It is then necessary to perform special operations with special tooling in the primary chamber.

It is accordingly an object of the invention to provide a tube-closing device of the type difined in the introduction hereto, with which it is possible to achieve an expecially reliable seal as a result of the relatively high surface pressure between the sealing surfaces of the tube plug and the corresponding opposing surfaces at the inner circumference of the tube, with which also the mechanical expense to obtain this surface pressure remains within reasonable limits, and with which also the removal of the set tube-plug i.e. the loosening of the sealing connection and withdrawal of the tube plug, is permitted.

With the foregoing and other objects in view, there is provided, in accordance with the invention, a tube-closing device with a tube plug having a plug casing with an enlargeable outer diameter for producing sealing surface pressure, and a plug core surrounded by the plug casing, the plug core and the plug casing being displaceable relative to one another, enlargement of the outer diameter of the plug casing being effected by a setting tool for the tube plug insertable into a respective tube to be closed, the setting tool being couplable with the plug core through the intermediary of a detachable holding rod and engageable with the plug casing through the intermediary of a support sleeve through which the holding rod extends, the setting tool having tensioning means for producing an axial relative displacement of the holding rod and the support sleeve and, thereby, of the plug casing and the plug core, comprising coaxially disposed cuff rings mounted on the plug casing for effecting a seal between the plug casing and the plug core, the cuff rings having a starting, unstressed conical form with an outer diameter at most equal to the inner diameter of the tube to be closed, the cuff rings being flattenable out of said conical form thereof by the relative displacement of the plug casing and the plug core so that the outer diameter thereof is enlarged and they dig slightly into the wall of the tube to be closed.

In accordance with another feature of the invention, the plug casing is subdivided into support discs, the cuff rings being spaced from one another on the plug casing and engaging at the inner circumference thereof with first contact surfaces of the support discs, the cuff rings in a region of outer ring zones thereof being in engagement with second contact surfaces located on a head portion of the plug core and, respectively, on the support discs, whereby flattening tensile forces are transferred from the first and the second contact surfaces to the cuff rings when the plug core and the plug casing are relatively displaced.

In accordance with a further feature of the invention, the cuff rings are elastically and plastically deformable so as to be withdrawable by applying a pulling force upon the plug core with the holding rod serving as a pulling element, out of the flattened sealing position thereof from the tube to be closed, first ring portions of the cuff rings extending beyond the plug casing being deformable in a direction opposite the direction in which the holding rod is pulled, and second ring portions of the cuff rings shifted into the axial spaces between the cuff rings being freed from contact with the wall of the tube to be closed.

In accordance with an additional feature of the invention, the plug core has a shaft with a free end formed with a thread, the holding rod being threadedly securable on the thread of the shaft.

In accordance with still another feature of the invention there is provided a tubular retaining nut seated on the threaded shaft and being screwable thereon a distance corresponding to the amount of relative displacement of the plug core and the plug casing, the tubular retaining nut having end-face contact surfaces engageable with corresponding opposing surfaces of the plug casing for ensuring maintenance of the tensioning position of the plug casing and the plug core.

In accordance with again an additional feature of the invention, the retaining nut has means for securing the nut against being twisted loose.

In accordance with yet a further feature of the invention the threaded shaft is formed with an outer grooved rim, and the securing means comprises a locking pawl engaging in the grooves of the grooved rim so as to form a directional lock.

In accordance with still a further feature of the invention the retaining nut is formed with a toothed rim at the outer end thereof, and including a threaded tube having a corresponding opposing toothed-rim end slideable by the holding within the support sleeve and couplable with the toothed rim.

In accordance with an additional feature of the invention the plug core has a shaft, and the support discs of the plug casing are disposed axially in series on the shaft and are formed with an inner neck portion slidingly guided on the shaft, the neck portion being formed with the first contact surfaces, the support discs being formed with axial ring projections of an outer collar part having the second contact surfaces thereon.

In accordance with again another feature of the invention the plug core has a head formed with an outer collar part with the second contact surfaces for an uppermost cuff ring, the plug core having an end piece forming a lowermost one of the support discs formed with the first contact surfaces facing towards the stack of support discs thereabove and engaging the lowermost cuff ring.

In accordance with still an additional feature of the invention the cuff rings are supported at the inner circumference thereof directly on the outer circumference of the shaft of the plug core, the cuff rings and the shaft being plastically deformable for forming a seal therebetween.

In accordance with yet a further feature of the invention the neck portion of the support discs and of the end piece, respectively, are formed at one side thereof with a flange ring defining, together with the adjacent support-disc end faces, a recess for sealingly seating the inner circumference of the cuff ring, the flange ring being receivable in an annular recess formed in the respectively adjacent support disc and plug head, respectively, when the tube plug is in a state of tension.

In accordance with yet still another feature of the invention at least two of the cuff rings are disposed between opposing contact surfaces, the two cuff rings being located with respect to one another like a cup spring.

In accordance with again a further feature of the invention, for at least one cuff-ring pair disposed between opposing contact surfaces, the cuff rings converge in cross section like a packed roof from the inner to the outer circumference thereof.

In accordance with yet an additional feature of the invention, for at least one cuff-ring pair disposed between opposing contact surfaces, the cuff rings diverge in V-shaped manner from the inner to the outer circumference thereof.

In accordance with again another feature of the invention, the at least two cuff rings like a cup spring package are mounted with the respective adjacent individual cups oriented in layers in the same direction and disposed between respective mutually opposing surfaces of the contact surfaces.

In accordance with yet another feature of the invention the cuff rings are mounted between the first and the second contact surfaces, respectively, mutually adjacent in axial direction of the plug and are inclined alternatingly in opposite directions.

In accordance with the concomitant feature of the invention the layers of the cuff rings are mounted between first and second of the opposing contact surfaces, respectively, mutually adjacent in axial direction of the plug and are inclined, as a group, alternatingly in opposite directions.

Due to their elastic and plastic deformability, corrosion-resistant steel alloy 1.4057 or Inconel X750, for example, have proved to be suitable materials for the cuff-rings which are clamped flat between the plug casing and the inner circumference of the heat-exchanger tube in such a manner, that very high surface pressures are generated at the sealing surfaces of the inner and outer circumferences of the cuff rings and the corresponding opposing surfaces. These surface pressures cause the cuff rings to become slightly impressed or dug into the inner circumference of the tube, which is required for a 100% effective seal. This deformation is also advantageous because it causes no damage to the heat exchanger tube. Basically, this advantageous sealing effect can be achieved with a single cuff ring. However, for safety reasons, it is practical to provide at least two coaxial cuff rings which are supported spaced from one another on the plug casing. A preferred construction form features a stack of three mutually spaced-apart cuff rings whith corresponding support discs. This arrangement provides an especially uniform loading of the inner circumference of the heat exchanger tube. For special applications, however, more than three cuff rings arranged in alignment and coaxially to one another, respectively, may also be provided on one tube plug. An angle of about 30°, in particular 33°, has been found to be an advantageous cone angle for the cuff rings, the outer diameter of these cuff rings being about 19 mm, and the inner diameter thereof about 11 mm. The thickness thereof was 1 mm. The "penetration depth" of the cuff-rings at the outer circumference thereof was only a few tenths of a millimeter. The elastic and plastic deformability of the cuff rings and their dimensioning have special importance for the withdrawal of the tube plug. In this regard, the ring portion extending beyond the plug casing is deformable in a direction opposite to the direction of pull or withdrawal of the tube plug; the ring portion which bends or shifts into the axial spaces between the cuff ring clear the inner circumference of the tube. The outer periphery of the cuff rings has sharp edges, in particular, disposed at right angles to the casing surfaces, because this results, on the one hand, in a scraping or brushing action for cleaning and scraping the sealing surfaces and, on the other hand, produces an especially intimate sealing contact in the "dug-in" seal position thereof. The surfaces of the inner circumference of the cuff rings, in contrast, may be slightly rounded, the swinging and bending motion thereof, respectively, being facilitated as they are flattened by pressure. Other features which are considered as characteristic for the invention are set forth in the appended claims.

Although the invention is illustrated and described herein as embodied in a tube closing device, especially for heat-exchanger tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 12 to FIG. 14 are views corresponding to that of FIG. 11 of three additional variations of the tube plug having a cup spring-like arrangement of the cuff rings i.e.

FIG. 12 having a double cuff ring splayed or spread out towards the outside,

FIG. 13 having double cuff rings splayed towards the inside, and

FIG. 14 having a package of three similarly layered individual cup rings and cuff rings, respectively, of reduced strength.

Figure 1:
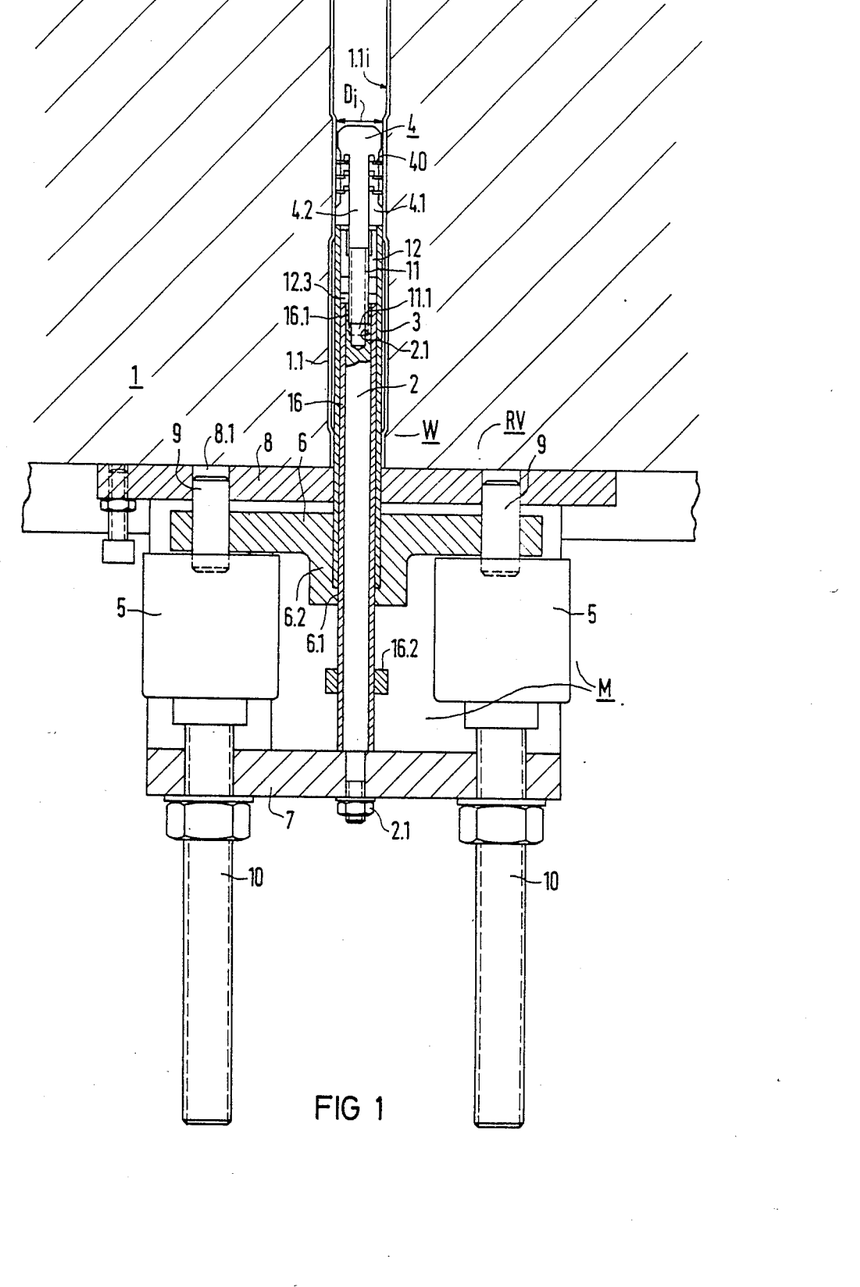
FIG. 1 is an elevational view, partly in section, of a tube closing device fastened to a steam-generator tube plate.

Referring now to the drawing and first, particularly, to FIG. 1 thereof, there is shown a tube closing device identified as a whole by reference character RV. The tube closing device RV is disposed on a tube plate 1 of an otherwise non-illustrated steam generator for a pressurized water nuclear reactor plant. The tube closing device RV is provided with tensioning means identified as a whole by reference character M for producing a relative axial displacement between a holding rod 2 and a support sleeve 3, the holding rod 2 and the support sleeve 3 being inserted into a steam generator tube 1.1 together with a tube plug 4 which is fastened to the holding rod 2. Only one such steam generator tube 1.1 is shown in FIG. 1 but, in reality, a great number of such tubes should be visualized as being distributed over the tube plate 1, and rolled or fitted pressure-sealed into corresponding bores formed in the tube plate 1, the ends of the tubes 1.1 being welded to the tube plate 1. The holding or tensioning means M may involve the head of a suitable manipulator; they are shown only diagrammatically. What is essential is the production of a displacement force between the holding rod 2 and the support sleeve 3, for which purpose, in the illustrated embodiment, hydraulic and pneumatic cylinders 5, respectively, are provided, having pistons which are connected to a pressure plate 6 which, in turn, engages the supporting sleeve 3 by means of a collar 6.1 and a hub 6.2 of the pressure plate 6. At the other side of the cylinders 5, the non-illustrated pistons of which are activatable from both sides, a pressure plate 7 is disposed, to which the holding rod 2 centrally extending through the sleeve 3, is anchored. The holding means M furthermore have, at the side of the tube plate 1, a mounting plate 8, which is centrally fastenable to the corresponding steam-generator tube ends by means of expanding pins or mandrels or the like, and the mounting plate 8 being formed with bores 8.1 wherein there are received corresponding guide pins 9 for the pressure plate 6 whereon the non-illustrated servopistons act. Fastening shafts or spindles 10 for the cylinders 5 extend through the pressure plate 7; these shafts 10 may also be used as support legs for the tube closing device RV and the holding means M, respectively. FIG. 1 shows that the support sleeve 3 may be pushed a given distance relative to the holding rod 2 into the tube 1.1 by the piston 5, the holding rod 2 being held fast at the pressure plate 7 by a threaded connection or bolted joint 2.1. In principle, it would also be possible, however, for the purpose of pulling the tube plug 4, to apply tensile or pulling forces to the holding rod 2 via the pressure plate 7 by correspondingly activating the cylinder 5. The distance or spacing between the pressure plate 6 and the mounting plate 8 serves to limit the stroke; it is adjustable.

For producing the sealing surface pressure, the tube plug 4 has a plug casing 4.1 having an enlargeable outer diameter, and a plug core 4.2 which is surrounded by the plug casing 4.1. As indicated hereinbefore, the plug casing 4.1 and core 4.2 are slidable with respect to one another, the enlargement or increase of the outer diameter of the plug casing 4.1 being thereby producible. The hereinafore-described adjusting means for the tube plug 4, identified as a whole by the reference character W, also include the holding rod 2 detachably connected to the plug core 4.2, the supporting sleeve 3, which axially engages the plug casing 4.1 and has the holding rod 2 extending therethrough, and also the tensioning means M.

Figure 2:
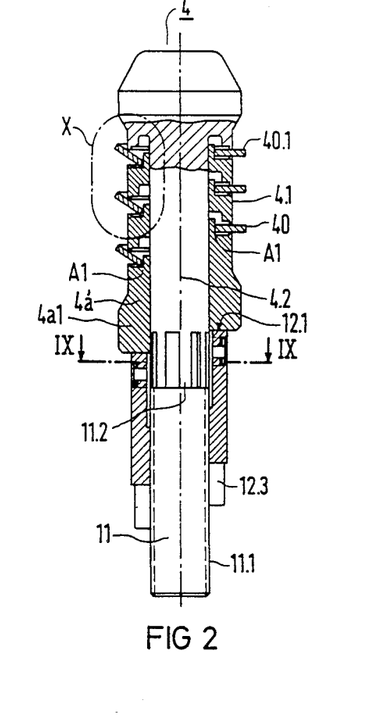
FIG. 2 is an enlarged fragmentary view of FIG. 1 showing a tube plug or stopper in greater detail.
Figure 3:
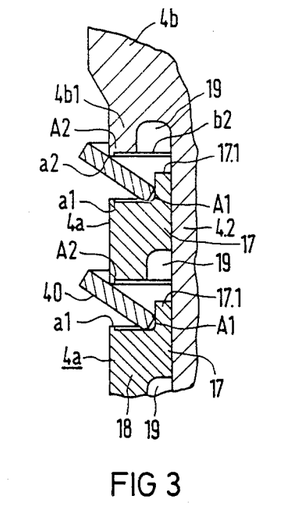
FIG. 3 is an enlarged fragmentary view of FIG. 2 showing in greater detail the structure enclosed within the dot-dash line X.
Figure 4:
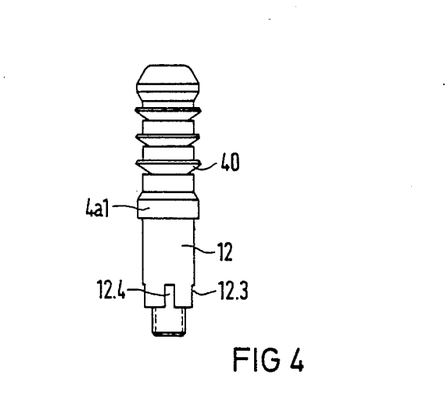
FIG. 4 is a reduced elevational view of FIG. 3.

As more clearly shown in FIGS. 2 and 4, cuff rings 40 disposed coaxially to one another are provided as sealing elements for the plug casing 4.1, the cuff rings 40 being supported between the plug casing 4.1 and the plug core 4.2 in a manner that, proceeding from the relaxed or unstressed, conical shape thereof (see the left-hand half of FIG. 2, FIG. 3 and FIG. 4) with an outer diameter $D_k$ (FIG. 5) smaller or, at most, equal to the inner tube diameter $D_i$ (FIG. 1), they may be brought to a flattened shape by relative displacement between the plug casing 4.1 and core 4.2, and the outer diameter thereof may be enlargeable (note the right-hand half of FIG. 2 and FIG. 1), so that they sealingly dig into the inner tube wall 1.1$i$ (FIG. 1) to a slight extent.

FIGS. 1 and 4 show that the plug casing 4.1 is provided with several cuff rings 40, namely three in the illustrated embodiment, spaced from one another in axial direction of the tube 1.1, the cuff rings 40 at the inner circumference thereof, engaging with first contact surfaces A1 of the casing 4.1 which is subdivided into support discs 4a. In vicinity of the outer ring zones thereof, the cuff rings 40 engage with second contact surfaces A2, which are located at a head portion 4b of the plug core 4.2 i.e. they are located at a ring-collar part 4b1 of the head portion 4b, and arranged, respectively, at the support discs 4a. The lowest support disc 4a' of the plug casing 4.1 is formed as a very elongated ring-shaped body with a thickened guide neck 4a1 (FIG. 2, FIG. 4). The lowest support disc 4a' will hereinafter be referred to as the end piece 4a'. By a comparison of the left-hand half of FIG. 2 with the right-hand half thereof, it can readily be seen that, with relative displacement of plug core 4.2 with respect to plug casing 4.1, the flattening tensile forces are transferred from the first and the second contact surfaces A1 and A2 to the cuff rings 40. To improve the force flow and the tensioning of the cuff rings 40, the second contact surfaces A2 are seated on a narrow, axially extending ring-collar a2 which defines a recess or groove b2. Also, the opposite support surface 4a2 of the support discs 4a has a corresponding recess for forming a projecting ring-collar a1.

Figure 6:
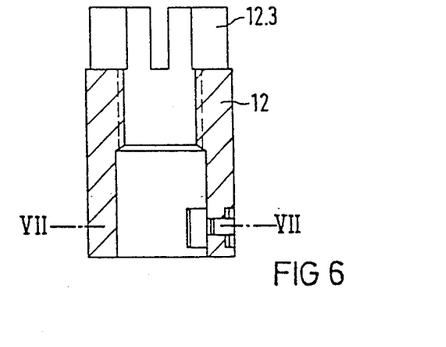
FIG. 6 is an enlarged sectional view of a retaining nut of FIGS. 2 and 4 which is threadable onto the threaded shaft of the plug core.
Figure 7:
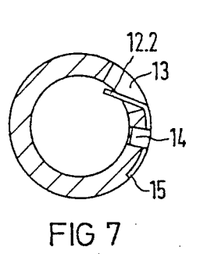
FIG. 7 is a cross-sectional view of FIG. 6 taken along the line VII—VII and showing, in particular, a locking pawl of the retaining nut.
Figure 8:
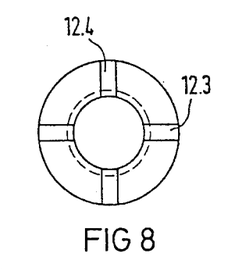
FIG. 8 is a plan view of the retaining nut of FIG. 7 showing the toothed rim thereof.
Figure 9:
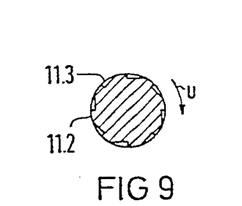
FIG. 9 is a cross-sectional view of FIG. 2 taken along the line IX—IX showing the shaft of the pipe core.

FIG. 1 shows that the plug core 4.2 is provided with a threaded shaft 11, to the end 11.1 of which the holding rod 2 can be screwed by its end 2.1 which has a mating inner thread. On the threaded shaft 11 of the plug core 4.2, there is seated a tubular retaining nut 12, which is adjustable over the extent of the relative displacement for ensuring the tensioned or clamped position of the plug casing 4.1 and core 4.2 with the end contact surfaces 12.1 thereof against corresponding opposing surfaces of the plug casing 4.1 i.e. the end piece 4a. In the right-hand part of FIG. 2, the retaining nut 12 is taken up or fully threaded on the shaft 11; in FIG. 1, an axial gap remains because the nut is not completely taken up or threaded on the shaft 11. The retaining nut 12 is secured against torsion so that it cannot loosen. For this purpose, the threaded shaft 11 is provided with an outer ring 11.2 of axially extending grooves 11.3 (FIG. 2 and FIG.), the grooves 11.3 having a somewhat triangular cross section, wherein a locking pawl 12.2 of the retaining nut 12 can engage in the sense of a directional lock, for which note the enlarged views of FIGS. 6 to 8. The locking pawl 12.2 is formed of an obtusely angled leaf spring having a free leg projecting inwardly through a window 13 formed at the circumference of the retaining nut 12, and having a fixed leg disposed in a recess formed at the outer circumference of the nut 12, and secured therein by a countersunk screw or a rivet 14, the end of this fixed leg being also able to be secured by welding at 15. In the direction of the take-up or threading, the nut 12 with the locking pawl 12.2 moves like a ratchet over the grooved ring 11.2 in a clock-wise direction U (FIG. 9), whereas the other rotational direction is blocked by the steep sides of the triangular notches 11.3.

For rotating the retaining nut 12 in the take-up direction, it is provided at the outer end thereof with a toothed rim 12.3 (shown especially in FIG. 2, 4, 6 and 8) formed by slots or milled grooves 12.4, which have a cruciform arrangement in the illustrated embodiment. A threaded tube 16 which is provided with a corresponding, mating toothed-rim end 16.1 is mounted within the support sleeve 3 (see FIG. 1) so that it can be moved by the holding rod 2, and can thus be coupled with the toothed rim or ring 12.3. The threaded tube 16 is rotatably supported on the holding rod 2 and has, welded thereto, a multisided ring 16.2 for the application of wrenches thereto; however, it could also be turned by remote control through the use of a suitable servomotor.

FIG. 2 and FIG. 3 clearly show that the support discs 4a, which are arranged axially in series on the shaft of the plug core 4.2, and also the end piece 4a' are slideably supported by a respective inner neck portion 17 thereof on the shaft of the plug core 4.2, and are provided at this neck portion 17 with the first contact surfaces A1. The second contact surfaces A2 are seated, on the other hand, at the axial ring projections of the outer collar parts 18, in particular at the collar part 4b1 of the head 4b. In the embodiment according to FIGS. 1 to 9, the basic construction of the support discs 4a and of the end piece 4a' is a configuration wherein the neck part 17 has formed at one side thereof a flange ring 17.1, and the end piece 4a' is constructed correspondingly. This flange ring 17.1 has, in the tensioned state, (note the right-hand half of FIG. 2) adequate space in the respective oppositely positioned ring-recess 19 of the adjacent support disc 4a and of the plug head 4b, respectively. For this reason, the support discs 4a have a somewhat Z-shaped profile.

Figure 10:
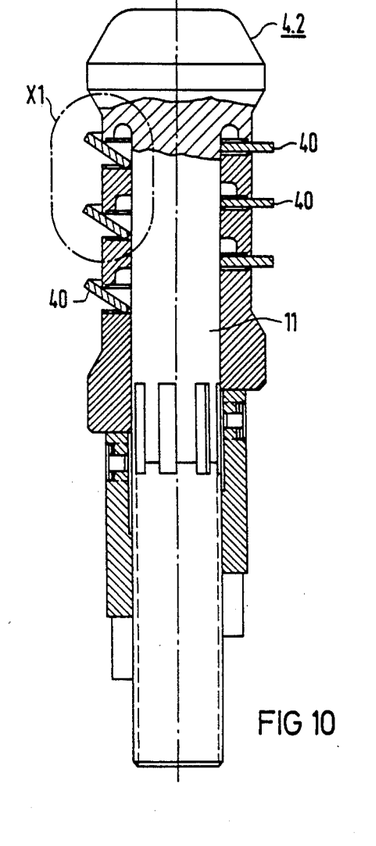
FIG. 10 is a view like that of FIG. 2 but enlarged, however, of another embodiment of the tube closing having a tube plug without any cuff or flange rings at the support discs.
Figure 11:
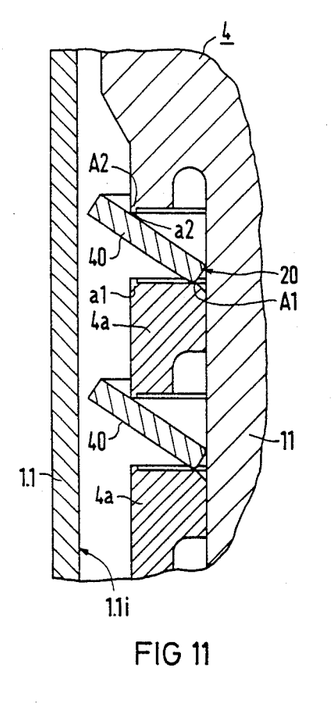
FIG. 11 is an enlarged fragmentary view of FIG. 10 showing in greater detail the structure enclosed within the dot-dash line XI.

FIG. 10 and FIG. 11 show a first variation of the tube plug for the embodiment described hereinbefore according to FIGS. 1 to 9, wherein the cuff rings 40 are supported by their preferably rounded inner circumference 20 directly disposed on or engaging the outer circumference of the shaft 11 of the plug core 4.2. The seal at this support point results mainly from the plastic deformation of the cuff rings 40 and the regions at the outer circumference of the shaft 11. Additional sealing contact surfaces for the cuff rings 40 result from the fact that the latter also contact, by the inner circumference thereof, the first contact areas A1 of the support discs 4a. At 1.1, as in FIG. 1, the steam generator tube surrounding the tube plug 4 is shown, the inner circumference thereof being identified by reference character 1.1i. Otherwise, there are no special differences in comparison with the embodiment according to FIGS. 2 and 3 and, for this reason, like parts are provided with the same reference characters. The advantage of the construction according to FIGS. 10 and 11 is, among others, that the extension of the cuff rings 40 in radial direction is greater than in the first embodiment, so that a greater stroke is available for tensioning purposes.

Figure 12:
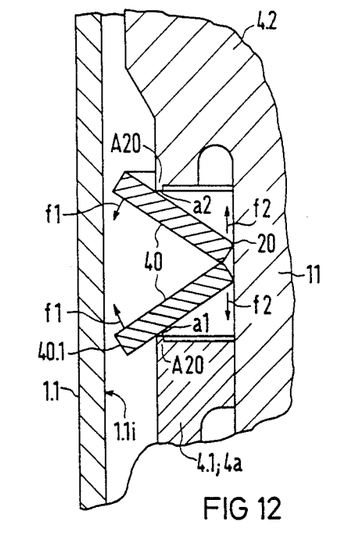
Figure 13:
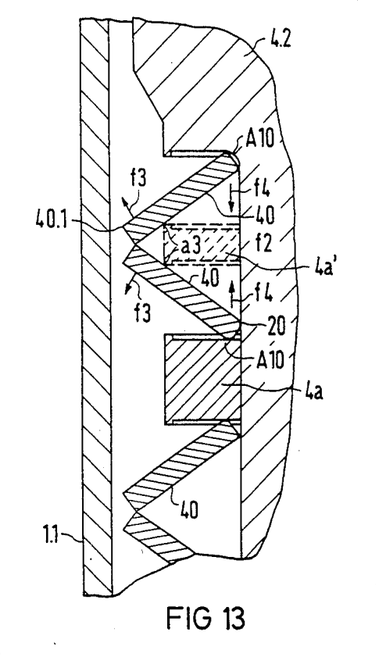
Figure 14:
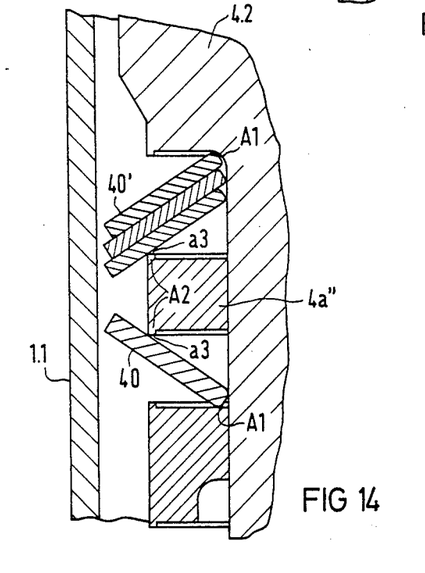

In the embodiment according to FIGS. 12 to 14, the views thereof again corresponding to that of FIG. 11 and FIG. 3, respectively, there are, respectively, at least two cuff rings 40 arranged between two mutually opposite contact surfaces of the plug core 4.2 and of the plug casing 4.1, the cuff rings 40 resting against one another like cup or plate springs. In the embodiment according to FIG. 12, a cuff-ring pair 40, 40 is arranged between the two opposite contact surfaces A20 in such a manner that the cross section of the cuff rings 40 diverges in a V-shape from the inner circumference 20 to the outer circumference 40.1 thereof. During the tensioning operation of the tube plug 4.2, the cuff rings 40 swing in accordance with the arrows f1 around the sealing and ring edges a1, a2 thereof, respectively, towards one another, but they also perform a translatory stripping or scraping motion with the inner circumference thereof upon the outer circumference of the shaft 11 of the tube plug in accordance with the arrow f2, if one visualizes that the tube plug 4.2 is held fixed and the plug casing 4.1 is displaced. The cuff rings scrape also a given distance along the inner circumference until they assume their final sealing seat at the inner circumference 1.1i of the heat exchanger tube 1.1. This scraping motion therein and also in all other embodiments has the advantage that the sealing seat is formed by directly compressed, plastically deformed metal parts. The contact surfaces are identified by reference character A20 in FIG. 12, because both thereof act upon the outer ring zones of the cuff rings 40.

In the embodiment according to FIG. 13, in each cuff-ring pair 40, 40 arranged between two opposite contact surfaces A10, the cuff rings converge arrow or roof-like from the inner circumference 20 thereof towards the outer circumference 40.1 thereof. In contrast with FIG. 12, the contact surfaces A10 engage with the inner circumference 20 of the cuff rings 40. During the tensioning operation, according to the arrows f3, the swinging movement of the cuff rings 40 runs opposite to the motion thereof according to the embodiment of FIG. 12. Also, the translatory scraping motion according to the arrows f4 runs opposite to the motion according to the arrows f2 of FIG. 12. As indicated by the dotted lines in FIG. 13, one can also insert between the two cuff rings 40 an intermediate support disc 4a' into the V-shaped interspace; this has the advantage that the swinging motion of the support or cuff rings 40, when being tensioned, must occur around the sealing edges a3, thereby resulting in an additional sealing point, and a better defined swinging motion. FIG. 13 shows also that, in connection with a support disc 4a belonging to the plug casing 4.1, an equivalent additional V-shaped cuff ring arrangement can be arranged adjacently in axial direction. This applies also to the arrangement according to FIG. 12, and likewise to that of FIG. 14 which will be described hereinafter.

Figure 5:
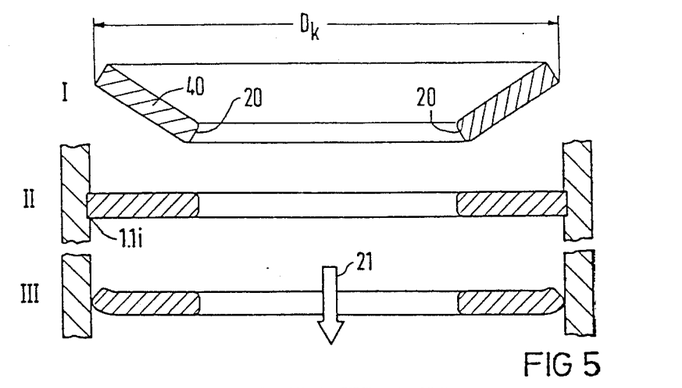
FIG. 5 is an enlarged cross-sectional view of an individual cuff ring of FIG. 2.

In the embodiment of FIG. 14, at least two cuff rings 40', like a plate or cup spring package, are positioned with adjacent individual layers similarly oriented, and between the first contact surfaces A1 in the region of the inner circumference thereof, and the second contact surfaces A2 near the outer circumference thereof. The strength of the individual cuff rings of such a cuff-ring package is purposely made less than at the cuff-ring arrangements described hereinbefore so that the deformation-forces, on the one hand, and the tension forces, on the other hand, do not become too great when the plug is to be pulled out again. The strength of the cuff rings depends upon the number thereof per cuff-ring package. FIG. 14 shows such a package formed of three adjacent cuff rings 40' oriented in the same direction. Below the support disc 4a'', which is provided with contact surfaces A2 having corresponding sealing edges a3, a single cuff ring 40 is shown, which is oriented in the opposite direction; instead of this construction, an additional cuff-ring package could be provided in a mirror-image of the first cuff-ring package, so that, in principle, the arrangement is as in FIG. 13, but with cuff-ring packages instead of individual cuff rings. The explanations provided hereinafter with the aid of FIG. 5, with regard to the deformation during tensioning and withdrawing of the cuff rings apply basically to all of the embodiments of the invention. There is shown in FIG. 5, besides the untensioned conical starting position I of a cuff ring 40, the flattened sealing position II and, additionally, a position III wherein, as clarified by the arrow 21, the tube plug and thereby the cuff ring 40 in the position II thereof was subjected to the pulling force of a withdrawal device, so that it was bent and plastically deformed respectively, opposite the withdrawal direction, in the regions of the outer circumference thereof. In this position III, the cuff ring 40 is freed from the inner tube circumference 1.1i, and can be pulled out without application of great force after the plastic deformation has taken place. Observing FIG. 2 i.e. the right-hand half thereof, one can see that there is adequate axial interspace between the adjacent cuff rings 40, so that the deformation according to position III can take place unhindered.

The foregoing is a description corresponding in substance to German Application No. P 32 12 223.3, dated Apr. 1, 1982, the International priority of which is being claimed for the instant application, and which is hereby made part of this application. Any material discrepancies between the foregoing specification and the aforementioned corresponding German application are to be resolved in favor of the latter.

We claim:

1. Tube-closing device with a tube plug having a plug casing with an enlargeable outer diameter for producing sealing surface pressure, and a plug core surrounded by the plug casing, the plug core and the plug casing being displaceable relative to one another, and a setting tool for the tube plug insertable into a respective tube to be closed for enlarging the outer diameter of the plug casing, the setting tool being couplable with the plug core through the intermediary of a detachable holding rod and engageable with the plug casing through the intermediary of a support sleeve through which the holding rod extends, the setting tool having tensioning means for producing an axial relative displacement of the holding rod and the support sleeve and, thereby, of the plug casing and the plug core, comprising coaxially disposed cuff rings, as sealing elements for the tube, said cuff rings being mounted between the plug casing and the plug core so as to have a starting, unstressed conical form with an outer diameter at most equal to the inner diameter of the tube to be closed, and so as to be flattenable out of said conical form thereof by the relative displacement of the plug casing and the plug core so that the outer diameter thereof is enlarged and the cuff rings are made of a material that will dig slightly into the wall of the tube to be closed.

2. Tube-closed device according to claim 1 wherein the plug casing is subdivided into support discs, said cuff rings being spaced from one another on the plug casing and engaging at the inner circumference thereof with first contact surfaces of said support discs, said cuff rings in a region of outer ring zones thereof being in engagement with second contact surfaces located on a head portion of the plug core and, respectively, on said support discs, whereby flattening tensile forces are transferred from said first and said second contact surfaces to said cuff rings when the plug core and plug casing are relatively displaced.

3. Tube-closing device according to claim 2 wherein said cuff rings are elastically and plastically deformable so as to be withdrawable, by applying a pulling force upon the plug core with the holding rod serving as a pulling element, out of said flattened sealing position thereof from the tube to be closed, first ring portions of said cuff rings extending beyond the plug casing being deformable in a direction opposite the direction in which said holding rod is pulled and second ring portions of said cuff rings shifted into the axial spaces between said cuff rings being freed from contact with the wall of the tube to be closed.

4. Tube-closing device according to claim 1 wherein the plug core has a shaft with a free end formed with a thread, the holding rod being threadedly securable on said thread of the shaft.

5. Tube-closing device according to claim 4 including a tubular retaining nut seated on the threaded shaft and being screwable thereon a distance corresponding to the amount of relative displacement of the plug core and the plug casing, said tubular retaining nut having end-face contact surfaces engageable with corresponding opposing surfaces of the plug casing for ensuring maintenance of the tensioning position of the plug casing and the plug core.

6. Tube-closing device according to claim 5 wherein said retaining nut has means for securing said nut against being twisted loose.

7. Tube-closing device according to claim 6 wherein said threaded shaft is formed with an outer grooved rim, and said securing means comprises a locking pawl engaging in the grooves of said grooved rim so as to form a directional lock.

8. Tube-closing device according to claim 5 wherein said retaining nut is formed with a toothed rim at the outer end thereof, and including a threaded tube having a corresponding opposing toothed-rim end slideable by the holding rod within the support sleeve and couplable with said toothed rim.

9. Tube-closing device according to claim 3 wherein the plug core has a shaft, and said support discs of the plug casing are disposed axially in series on said shaft and are formed with an inner neck portion slidingly guided on said shaft, said neck portion being formed with said first contact surfaces, said support discs being formed with axial ring projections of an outer collar part having said second contact surfaces thereon.

10. Tube-closing device according to claim 9 wherein the plug core has a head formed with an outer collar part with said second contact surfaces for an uppermost cuff ring, said plug core having an end piece forming a lowermost one of said support discs formed with said first contact surfaces facing towards the stack of support discs thereabove and engaging the lowermost cuff ring.

11. Tube-closing device according to claim 10 wherein said cuff rings are supported at the inner circumference thereof directly on the outer circumference of the shaft of the plug core, said cuff rings and said shaft being plastically deformable for forming a seal therebetween.

12. Tube-closing device according to claim 10 wherein said neck portion of said support discs and of said end piece, respectively, are formed at one side thereof with a flange ring defining, together with the adjacent support-disc end faces, a recess for sealingly seating the inner circumference of the cuff ring, said flange ring being receivable in an annular recess formed in the respectively adjacent support disc and plug head, respectively, when the tube plug is in a state of tension.

13. Tube-closing device according to claim 1 wherein at least two of the cuff rings are disposed between opposing contact surfaces, said two cuff rings being located with respect to one another like a cup spring.

14. Tube-closing device according to claim 13 wherein for at least one cuff-ring pair disposed between opposing contact surfaces, the cuff rings converge in cross section like a peaked roof from the inner to the outer circumference thereof.

15. Tube-closing device according to claim 13 wherein, for at least one cuff-ring pair disposed between opposing contact surfaces, the cuff rings diverge in V-shaped manner from the inner to the outer circumference thereof.

16. Tube-closing device according to claim 13 wherein said at least two cuff rings like a cup spring package are mounted with the respective adjacent individual cups oriented in layers in the same direction and disposed between respective mutually opposing surfaces of said contact surfaces.

17. Tube-closing device according to claim 12 wherein said cuff rings are mounted between said first and said second contact surfaces, respectively, mutually adjacent in axial direction of the plug and are inclined alternatingly in opposite directions.

18. Tube-closing device according to claim 16 wherein said layers of cuff rings are mounted between first and second of said opposing contact surfaces, respectively, mutually adjacent in axial direction of the plug and are inclined, as a group, alternatingly in opposite directions.

* * * * *